United States Patent
Yoon et al.

(10) Patent No.: US 9,136,526 B2
(45) Date of Patent: Sep. 15, 2015

(54) METHOD OF MANUFACTURING ANODE ACTIVE MATERIAL, AND ANODE AND LITHIUM BATTERY USING THE ANODE ACTIVE MATERIAL

(71) Applicant: KOREA INSTITUTE OF ENERGY RESEARCH, Daejeon (KR)

(72) Inventors: Sukeun Yoon, Daejeon (KR); Kyung-Hee Shin, Seoul (KR); Chang soo Jin, Daejeon (KR); Kyu-Nam Jung, Daejeon (KR); Bum-suk Lee, Daejeon (KR); Myung-seok Jeon, Daejeon (KR); Sun-Hwa Yeon, Daejeon (KR); Jae-Deok Joen, Daejeon (KR); Jun-Mook Shim, Daejeon (KR); Jung-Hoon Yang, Daejeon (KR); Myung-Hyun Ryu, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 267 days.

(21) Appl. No.: 13/855,063

(22) Filed: Apr. 2, 2013

(65) Prior Publication Data
US 2013/0280603 A1    Oct. 24, 2013

(30) Foreign Application Priority Data

Apr. 20, 2012  (KR) .................. 10-2012-0041237
Jan. 4, 2013   (KR) .................. 10-2013-0000959

(51) Int. Cl.
*H01M 4/04*     (2006.01)
*H01M 4/133*    (2010.01)
*H01M 4/131*    (2010.01)
*H01M 4/36*     (2006.01)
*H01M 4/485*    (2010.01)
*H01M 4/587*    (2010.01)

(52) U.S. Cl.
CPC .............. *H01M 4/04* (2013.01); *H01M 4/0438* (2013.01); *H01M 4/0471* (2013.01); *H01M 4/131* (2013.01); *H01M 4/133* (2013.01); *H01M 4/362* (2013.01); *H01M 4/485* (2013.01); *H01M 4/587* (2013.01); *Y02E 60/122* (2013.01)

(58) Field of Classification Search
CPC ..... H01M 4/04; H01M 4/133; H01M 4/0438; H01M 4/0471; H01M 4/131; H01M 4/362; H01M 4/485; H01M 4/587; Y02E 60/122
See application file for complete search history.

(56) References Cited

U.S. PATENT DOCUMENTS

| | | | |
|---|---|---|---|
| 7,229,944 B2 | 6/2007 | Shao-Horn et al. | |
| 2006/0019819 A1 | 1/2006 | Shao-Horn et al. | |
| 2010/0009267 A1* | 1/2010 | Chase et al. | ............. 429/320 |
| 2010/0330419 A1 | 12/2010 | Cui et al. | |

OTHER PUBLICATIONS

A. R. Armstrong, et al., TiO2-B Nanowires, Angew. Chem. Int. Ed., 2004, pp. 2286-2288.

(Continued)

*Primary Examiner* — Raymond Alejandro
(74) *Attorney, Agent, or Firm* — Cantor Colburn LLP

(57) ABSTRACT

Disclosed is to a method of manufacturing an anode active material, including mixing a first solution having a metal oxide precursor dissolved therein, a second solution having a polymer as a carbon fiber precursor dissolved therein, and an ionic liquid solution for nitrogen doping and formation of a porous structure, thus preparing an electrospinning solution, electrospinning the electrospinning solution, thus preparing a metal oxide-nitrogen-porous carbon nanofiber composite, and thermally treating the composite, and to an anode and a lithium battery using the anode active material.

7 Claims, 10 Drawing Sheets

(56) References Cited

OTHER PUBLICATIONS

W. Zhu, et al., Band Gap Narrowing of Titanium Oxide Semiconductors by Noncompensated Anion-Cation Codoping for Enhanced Visible-Light Photoactivity, Physical review letters, 2009, pp. 226401-1-226401-4.

J. S. Chen, et al., Constructing Hierarchical Spheres from Large Ultrathin Anatase TiO2 Nanosheets with Nearly 100% Exposed (001) Facets for Fast Reversible Lithium Storage, J. Am. Chem. Soc., 2010, pp. 6124-6130.

Y. Wang, et al., Electrochemical performance of W-doped anatase TiO2 nanoparticles as an electrode material for lithium-ion batteries, J. Mater. Chem., 2011, pp. 6006-6013.

L. Ren, et al., An architectured TiO2 nanosheet with discrete integrated nanocrystalline subunits and its application in lithium batteries, Journal of Materials Chemistry, 2012, pp. 21513-21518.

M. R. Jo, et al., Tailored Li4Ti5O12 nanofibers with outstanding kinetics for lithium rechargeable batteries, Nanoscale, 2012, pp. 6870-6875.

W. Luo, et al., Electrospun porous ZnCo2O4 nanotubes as a high-performance anode material for lithium-ion batteries, J. Mater. Chem., 2012, pp. 8916-8921.

Y. Yoshida, et al., 1-Ethyl-3-methylimidazolium Based Ionic Liquids Containing Cyano Groups: Synthesis, Characterization, and Crystal Structure, Inorganic Chemistry, 2004, pp. 1458-1462.

X. Wang, et al., Ionic Liquids as Versatile Precursors for Functionalized Porous Carbon and Carbon-Oxide Composite Materials by Confined Carbonization, Angew. Chem. Int. Ed., 2010, pp. 6664-6668.

* cited by examiner

METHOD OF MANUFACTURING ANODE ACTIVE MATERIAL, AND ANODE AND LITHIUM BATTERY USING THE ANODE ACTIVE MATERIAL

BACKGROUND OF THE INVENTION

1. Field of the Invention

The present invention relates to a method of manufacturing an anode active material composed of carbon nanofibers, and an anode and a lithium battery using the anode active material, and, more particularly, to a method of manufacturing an anode active material which is composed of nitrogen-doped porous carbon nanofibers containing a nano-sized metal oxide, and to an anode and a lithium battery using the anode active material.

2. Description of the Related Art

Recently, lithium batteries have been variously utilized in electric vehicles and power storage devices, in addition to uses as main power sources of small electronic devices, such as mobile phones, notebook computers, etc. The usage of lithium batteries which store electrochemical energy is becoming diversified, and the demand for lithium batteries, a decrement in the capacity of which is low despite frequent charge-discharge, is increasing.

As an anode active material presently useful in the lithium batteries, graphite, which is a carbonaceous material with good lifetime properties, is commercially available, but graphite has a very low theoretical capacity of 372 mAh/g, and a solid electrolyte membrane formed on the surface of the active material upon charge-discharge may undesirably cause safety problems of the lithium battery. Thorough research into alternatives to graphite having low capacity and safety problems is ongoing, and the use of, as the anode active material, a metal oxide such as, for example, $TiO_2$, $Li_4Ti_5O_{12}$, $KNb_5O_{13}$, $Fe_2O_3$, $Co_3O_4$, $MnO_2$, $MoO_2$, $MoO_3$, NiO, CuO, etc., wherein an intercalation reaction or a conversion reaction takes place, is being studied.

However, a metal oxide such as $TiO_2$, $Li_4Ti_5O_{12}$, $KNb_5O_{13}$, etc., wherein an intercalation reaction occurs, is limited in terms of theoretical capacity, and a metal oxide such as $Fe_2O_3$, $Co_3O_4$, $MnO_2$, etc., wherein a conversion reaction occurs, is limited in the transfer rate of lithium and may incur volume expansion upon reaction with lithium, thus generating an active material electrically isolated in the electrodes, undesirably resulting in lowered rate capability.

With the goal of solving the above problems, nano-structured materials are widely studied. The nano-structured materials refer to one-, two-, or three-dimensional structured nanomaterials, and may include nanorods, nanowires, nanoflowers, or nanospheres, as proposed by Nano Lett., 9, (2009) 1045, Angew. Chem., Int. Ed., 48 (2009) 1660, J. Phys. Chem. C, 112 (2008) 4836, Chem. Commun. (2006) 2783. Such nano-structured materials may alleviate aggregation or breakage of the active material, thus reducing changes in stress and volume in the electrodes upon charge-discharge, thereby exhibiting battery characteristics including high capacity and high stability. However, the use of an electrode active material having a large surface area may undesirably increase side-reactions with the electrolyte and may decrease energy density per volume.

Hence, the introduction of an anode active material able to achieve a lithium battery having high capacity and high stability is required to solve such problems.

SUMMARY OF THE INVENTION

Accordingly, the present invention has been made keeping in mind the above problems encountered in the related art, and the present invention is intended to provide a method of manufacturing an anode active material which may increase not only conductivity of a lithium secondary battery but also capacity and stability thereof, and specifically to provide a method of manufacturing an anode active material which is composed of porous carbon nanofibers produced by electrospinning a solution comprising a metal oxide precursor, a carbon fiber precursor solution and an ionic liquid solution and then performing thermal treatment, and also provide an anode and a lithium battery using such an anode active material.

The technical problem, which is to be achieved by the present invention, is not limited thereto.

The present invention provides a method of manufacturing an anode active material, comprising mixing a first solution having a metal oxide precursor dissolved therein, a second solution having a polymer as a carbon fiber precursor dissolved therein, and an ionic liquid solution for nitrogen doping and formation of a porous structure, thus preparing an electrospinning solution; electrospinning the electrospinning solution, thus preparing a metal oxide-nitrogen-porous carbon nanofiber composite; and thermally treating the composite.

Specifically, a solvent used in the first solution and the second solution may be any one selected from the group consisting of distilled water, dimethylformamide, phenol, toluene, ethanol, methanol, and propanol.

The metal oxide precursor may be titanium butoxide (TBO) or a metal chloride.

The metal chloride may be any one selected from the group consisting of titanium isopropoxide ($Ti(OCH(CH_3)_2)_4$), titanium chloride ($TiCl_4$ or $TiCl_3$), tin hydrate ($SnCl_2.H_2O$), iron chloride ($FeCl_3$), nickel chloride ($NiCl_2$), copper chloride ($CuCl_2$), magnesium chloride ($MgCl_2$), palladium chloride ($PdCl_2$), cobalt chloride ($CoCl_2$), tantalum chloride ($TaCl_2$), manganese chloride ($MnCl_2$), iron nitrate ($Fe(NO_3)_2$, $Fe(NO_3)_3$), nickel nitrate ($Ni(NO_3)_2$), copper nitrate ($Cu(NO_3)_2$), magnesium nitrate ($Mg(NO_3)_2$), cobalt nitrate ($Co(NO_3)_2$), manganese nitrate ($Mn(NO_3)_2$), manganese acetate ($Mn(CO_2CH_3)_2$), iron acetate ($Fe(CO_2CH_3)_2$), nickel acetate ($Ni(CO_2CH_3)_2$), cobalt acetate ($Co(CO_2CH_3)_2$), zinc acetate ($Zn(CO_2CH_3)_2$), and copper acetate ($Cu(CO_2CH_3)_2$).

The polymer may be any one selected from the group consisting of polyvinylpyrrolidone (PVP), polymethylmethacrylate (PMMA), polyvinyl alcohol (PVA), polyvinylacetate (PVAC), polyacrylonitrile (PAN), polyfurfuryl alcohol, cellulose, glucose, polyvinyl chloride (PVC), polyacrylic acid, polylactic acid, polyethylene oxide (PEO), polypyrrole, polyimide, polyamideimide, polyaramid, polyaniline (PANI), phenol resin, and pitch.

The ionic liquid solution may be any one selected from the group consisting of ethylmethylimidazolium chloride (EMIM Cl), ethylmethylimidazolium dicyanamide (EMIM DCA), ethylmethylimidazolium trifluoromethanesulfonate (EMIM Otf), ethylmethylimidazolium tri fluoromethylsulfonylimide (EMIM TFSI), ethylmethylimidazolium acetate (EMIM Ac), ethylmethylimidazolium hydroxide (EMIM OH), ethylmethylimidazolium diethylphosphate (EMIM DEP), ethylmethylimidazolium methyl carbonate (EMIM MeOCO$_2$), ethylmethylimidazolium lactate (EMIM lactate), butylmethylimidazolium chloride (BMIM Cl), butylmethylimidazolium methylcarbonate solution (BMIM MeOCO$_2$), butylmethylimidazolium trifluoromethanesulfonate (BMIM Otf), butylmethylimidazolium tri fluoromethylsulfonylimide (BMIM TFSI), butylmethylimidazolium trifluoroacetate (BMIM CF$_3$CO$_2$), and dimethylimidazolium methanesulfonate (MMIM CH$_3$SO$_3$).

The preparing the composite may be performed by maintaining the electrospinning solution at 70° C. or less, and applying a voltage of 10~25 kV while supplying the electrospinning solution at a flow rate of 0.1~1 mL/h, so that electrospinning is carried out.

The thermally treating the composite may comprise primarily heating the composite to 280° C., thermally treating the primarily heated composite in an air atmosphere for 3~5 hr, secondarily heating the thermally treated composite to 500° C., and thermally treating the secondarily heated composite in an argon (Ar) atmosphere for 1~5 hr, wherein the thermally treating in the air atmosphere and the secondarily heating may be successively performed.

In addition, an anode using an anode active material manufactured by the above method may be formed. Specifically, the anode according to the present invention may be formed by coating a current collector with a slurry comprising an anode active material, a conductive material, a binding material, and a solvent, which are mixed together, wherein the anode active material may comprise nitrogen-doped porous carbon nanofibers containing a metal oxide.

The porous carbon nanofibers may have an average diameter of 0.1~1 μm.

The metal oxide may be titanium oxide.

In addition, a lithium battery using an anode active material manufactured by the above method may be formed. Specifically, the lithium battery according to the present invention may comprise a cathode, an anode, and a separator, wherein the anode may comprise nitrogen-doped porous carbon nanofibers containing a metal oxide.

The porous carbon nanofibers may have an average diameter of 0.1~1 μm.

The metal oxide may be titanium oxide.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
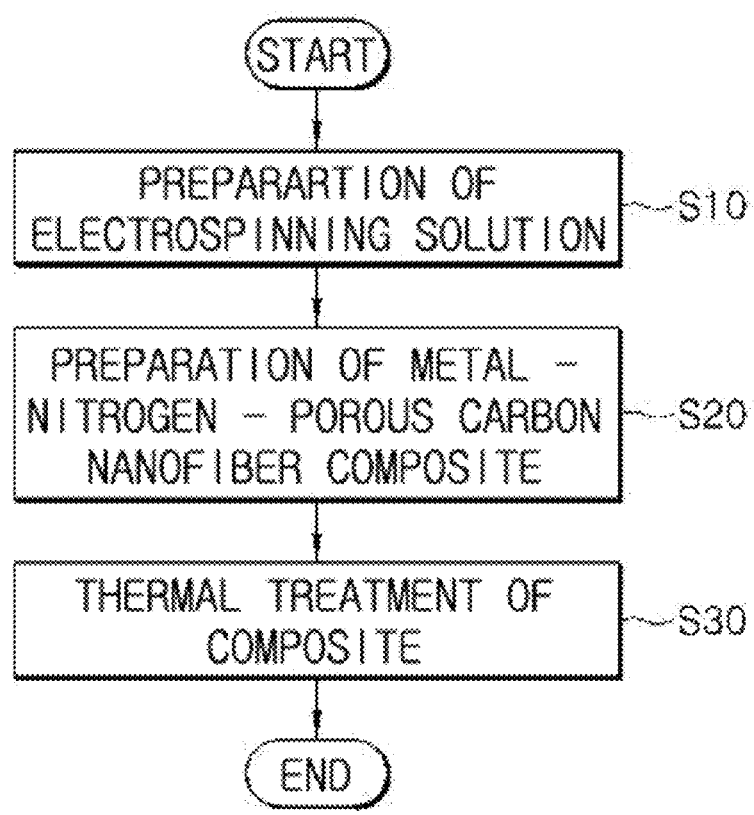
FIG. 1 is a flowchart illustrating a process of manufacturing an anode active material according to the present invention.

Hereinafter, a detailed description will be given of preferred embodiments of the present invention with reference to the appended drawings. Throughout the drawings, the same elements are designated by the same reference numerals as much as possible. Also, it is to be noted that, when the known functions and constructions may make the gist of the present invention unclear, a detailed description thereof will be omitted.

The present invention provides, as an anode active material, nitrogen-doped porous carbon fibers containing a metal oxide (especially titanium oxide). Because the anode active material may exhibit superior initial efficiency and high capacity retention, it may be efficiently used in an anode for a lithium battery and a lithium battery including the anode.

According to an embodiment of the present invention, the anode active material is composed of titanium oxide ($TiO_2$), carbon (C), and nitrogen (N), wherein titanium oxide is uniformly distributed in nitrogen-doped porous carbon, thus exhibiting superior initial efficiency and capacity retention.

As such, titanium oxide enables lithium ions to be stably extracted/inserted without any change in crystalline structure, but has low electrical conductivity, undesirably resulting in rate capability problems. However, because carbon nanofibers are doped with nitrogen and have a porous structure, the above problems are solved, thus improving cycle properties and rate capability.

Specifically, the anode active material according to the present invention is preferably configured such that at least one of nitrogen and porous carbon is coupled with titanium oxide. That is, the nitrogen-doped porous carbon nanofibers are coupled with titanium oxide, thereby preventing deterioration of cycle properties due to low electrical conductivity of titanium oxide and improving electrical conductivity.

Also, the carbon fibers having a porous structure cause rapid diffusion of lithium, thus improving rate capability.

Such carbon may be present in amorphous form, and is particularly present in amorphous form at the grain boundaries between titanium oxide components.

The anode active material according to the present invention may be manufactured using an electrospinning process.

Specifically, as illustrated in the flowchart of FIG. 1, a method of manufacturing the anode active material includes preparing an electrospinning solution (S10), preparing a metal oxide-nitrogen-porous carbon nanofiber composite (S20), and thermally treating the composite (S30).

A first solution having a metal oxide precursor dissolved therein, a second solution having a polymer as a carbon fiber precursor dissolved therein, and an ionic liquid solution for nitrogen doping and formation of a porous structure are mixed, thus preparing the electrospinning solution (S10).

The solvent for the first solution and the second solution may include any one selected from the group consisting of distilled water, dimethylformamide, phenol, toluene, ethanol, methanol, and propanol. Also, the metal oxide precursor may include titanium butoxide (TBO) or a metal chloride. As such, the metal chloride may be any one selected from the group consisting of titanium isopropoxide ($Ti(OCH(CH_3)_2)_4$), titanium chloride ($TiCl_4$ or $TiCl_3$), tin hydrate ($SnCl_2.H_2O$), iron chloride ($FeCl_3$), nickel chloride ($NiCl_2$), copper chloride ($CuCl_2$), magnesium chloride ($MgCl_2$), palladium chloride ($PdCl_2$), cobalt chloride ($CoCl_2$), tantalum chloride ($TaCl_2$), manganese chloride ($MnCl_2$), iron nitrate ($Fe(NO_3)_2$, $Fe(NO_3)_3$), nickel nitrate ($Ni(NO_3)_2$), copper nitrate ($Cu(NO_3)_2$), magnesium nitrate ($Mg(NO_3)_2$), cobalt nitrate ($Co(NO_3)_2$), manganese nitrate ($Mn(NO_3)_2$), manganese acetate ($Mn(CO_2CH_3)_2$), iron acetate ($Fe(CO_2CH_3)_2$), nickel acetate ($Ni(CO_2CH_3)_2$) cobalt acetate ($Co(CO_2CH_3)_2$), zinc acetate ($Zn(CO_2CH_3)_2$), and copper acetate ($Cu(CO_2CH_3)_2$).

The polymer, which functions as the carbon fiber precursor, may include any one selected from the group consisting of polyvinylpyrrolidone (PVP), polymethylmethacrylate (PMMA), polyvinyl alcohol (PVA), polyvinylacetate (PVAC), polyacrylonitrile (PAN), polyfurfuryl alcohol, cellulose, glucose, polyvinyl chloride (PVC), polyacrylic acid, polylactic acid, polyethylene oxide (PEO), polypyrrole, polyimide, polyamideimide, polyaramid, polyaniline (PANI), phenol resin, and pitch.

The ionic liquid solution, which is mixed to prepare the electrospinning solution, may include any one selected from the group consisting of ethylmethylimidazolium chloride (EMIM Cl), ethylmethylimidazolium dicyanamide (EMIM DCA), ethylmethylimidazolium trifluoromethanesulfonate (EMIM Otf), ethylmethylimidazolium tri fluoromethylsulfonylimide (EMIM TFSI), ethylmethylimidazolium acetate (EMIM Ac), ethylmethylimidazolium hydroxide (EMIM OH), ethylmethylimidazolium diethylphosphate (EMIM DEP), ethylmethylimidazolium methyl carbonate (EMIM $MeOCO_2$), ethylmethylimidazolium lactate (EMIM lactate), butylmethylimidazolium chloride (BMIM Cl), butylmethylimidazolium methylcarbonate solution (BMIM $MeOCO_2$), butylmethylimidazolium trifluoromethanesulfonate (BMIM Otf), butylmethylimidazolium tri fluoromethylsulfonylimide (BMIM TFSI), butylmethylimidazolium trifluoroacetate (BMIM $CF_3CO_2$), and dimethylimidazolium methanesulfonate (MMIM $CH_3SO_3$).

Figure 2:
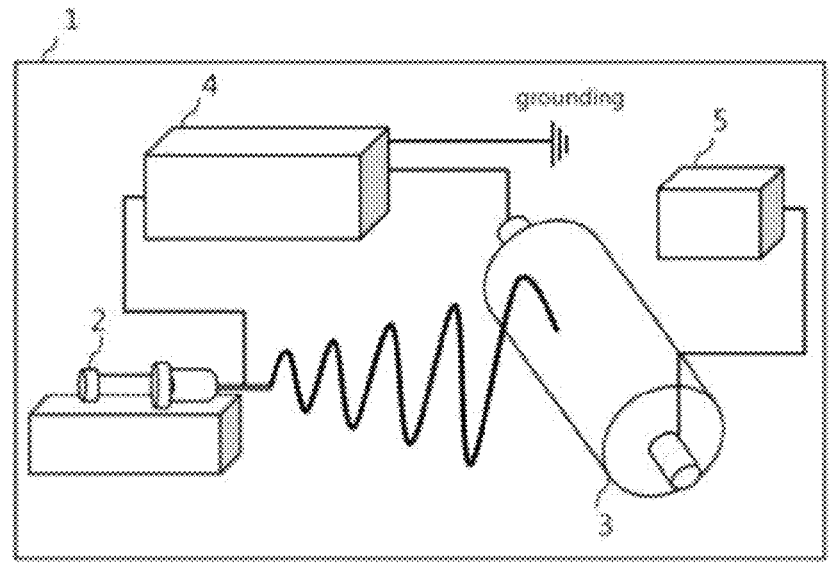
FIG. 2 is a schematic view illustrating an electrospinning device for manufacturing the anode active material according to the present invention.

Subsequently, the prepared electrospinning solution is electrospun using an electrospinning device as illustrated in FIG. 2, thereby obtaining a metal oxide-nitrogen-porous carbon nanofiber composite (S20). The metal oxide-nitrogen-porous carbon nanofiber composite may be provided in the form of nitrogen-doped porous carbon nanofibers containing a metal oxide.

As the electrospinning device, a known device may be utilized, or a device wherein the known device is partially modified to increase the production yield may be used. The metal oxide-nitrogen-porous carbon nanofiber composite according to the present invention is collected by a drum type collection unit spaced apart by 20~30 cm from the tip of the electrospinning nozzle of the electrospinning device.

The electrospinning process may be performed by maintaining the temperature of a chamber containing the electrospinning solution at 70° C. or less, and applying a voltage of 10~25 kV while supplying the electrospinning solution at a flow rate of 0.1~1 mL/h. If the magnitude of the applied voltage is less than 10 kV, it is difficult to prepare carbon nanofibers according to the present invention because of the low voltage. In contrast, if the magnitude of the voltage exceeds 25 kV, the prepared carbon nanofibers may be lost or deformed due to the excessively high voltage.

Figure 3:
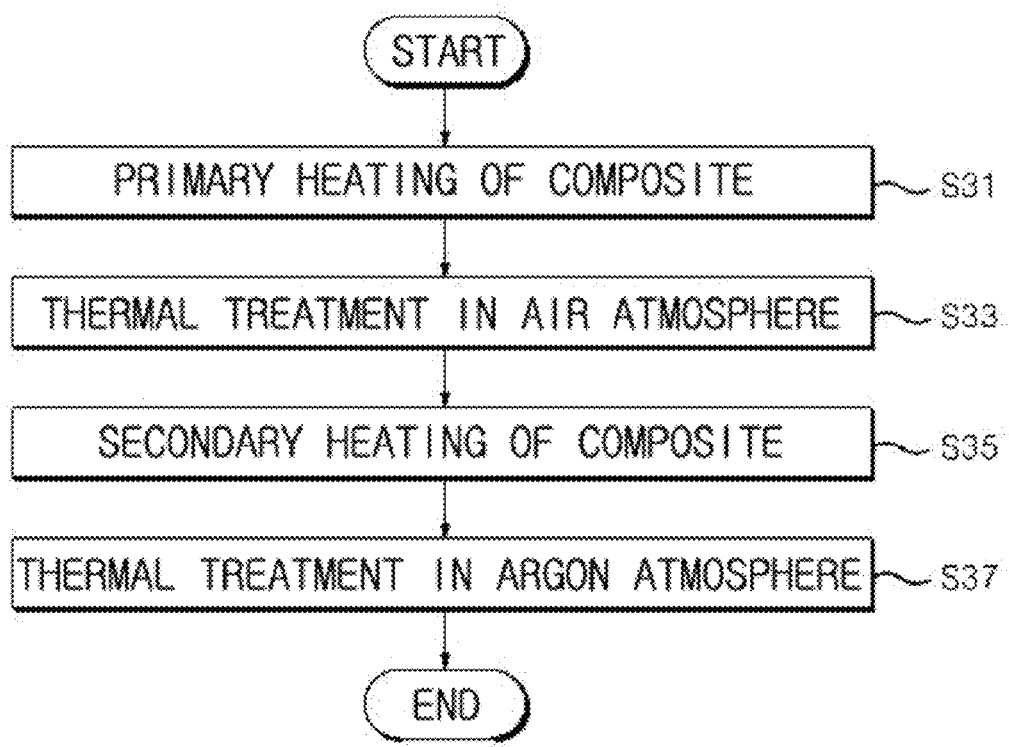
FIG. 3 is a flowchart illustrating a thermal treatment procedure in the process of manufacturing the anode active material according to the present invention.

Subsequently, the metal oxide-nitrogen-porous carbon nanofiber composite is thermally treated (S30). As illustrated in the flowchart of FIG. 3, the thermal treatment procedure is conducted by subjecting the composite to a series of primary heating (S31), primary thermal treatment for 3~5 hr in an air atmosphere (S33), secondary heating (S35), and secondary thermal treatment for 1~5 hr in an argon (Ar) atmosphere (S37), wherein the primary thermal treatment in an air atmosphere (S33) and the secondary heating (S35) are successively carried out without any temporal interval therebetween.

Specifically, the metal oxide-nitrogen-porous carbon nanofiber composite is heated to 280° C. (S31), thermally treated for 3~5 hr in an air atmosphere (S33), immediately heated to 550° C. (S35), and then thermally treated for 1~5 hr in an Ar atmosphere (S37).

The primary heating and the primary thermal treatment (S31, S33), corresponding to the first thermal treatment zone, may stably maintain the shape of the carbon nanofibers of the metal oxide-nitrogen-porous carbon nanofiber composite. The secondary heating and the secondary thermal treatment (S35, S37), corresponding to the second thermal treatment zone, may convert the metal oxide precursor into a metal oxide while the shape of the carbon nanofibers is maintained. In the case where the thermal treatment of the nitrogen-doped porous carbon nanofibers containing the metal oxide is carried out at a temperature higher than 700° C., the nanofibers may be deformed or carbon may be burnt during the thermal treatment.

Also, upon manufacturing the anode active material, the treatment conditions may be appropriately changed, so that the average size of metal oxide, the size of pores, and the thickness of carbon fibers may vary. Furthermore, the metal oxide used to manufacture the anode active material is preferably titanium oxide.

The anode active material thus manufactured is mixed with a conductive material, a binding material, a solvent, etc., thus preparing a slurry, which is then applied on a current collector and dried, thus manufacturing an anode.

According to the present invention, the anode active material comprising the nitrogen-doped carbon nanofibers containing the metal oxide forms an anode active material layer, together with a conductive material, a binding material, etc., and the anode active material layer is formed on the current collector, thus forming the anode. As such, the metal oxide may be titanium oxide.

Meanwhile, the current collector for an anode may include copper, nickel or SUS. Particularly useful is a copper current collector having the greatest electrical conductivity. The anode active material layer formed on the current collector is obtained by mixing the anode active material, the conductive material, the binding material and the solvent, thus preparing an anode active material composition, after which the current collector is directly coated with the composition, or after which the composition may be cast on an additional support and then an anode active material film which was separated from the support may be laminated on the current collector.

Also, examples of the conductive material used to form the anode active material layer may include, but are not limited to, carbon black, graphite particles, etc., and any material may be used so long as it is useful as a conductive material in the art.

Also, examples of the binding material may include, but are not limited to, a vinylidene fluoride/hexafluoropropylene copolymer, polyvinylidene fluoride (PVDF), polyacrylonitrile, polymethylmethacrylate, polytetrafluoroethylene (PTFE), and mixtures thereof, styrene butadiene rubber polymer (SBR), etc., and any material may be used so long as it is useful as a binding material in the art.

Examples of the solvent may include, but are not limited to, N-methylpyrrolidone, ethanol, acetone, and water, and any solvent may be used so long as it is useful in the art.

Upon manufacturing a lithium battery according to the present invention, the amounts of anode active material, conductive material, binding material, and solvent may be set to the levels typically necessary for a lithium battery, and one or more selected from among the conductive material, the binding material, and the solvent may be omitted depending on the end uses and configuration of the lithium battery.

In addition, the lithium battery may be manufactured using the following method.

As mentioned above, the anode is prepared.

Subsequently, like the anode, a cathode may be formed by mixing a cathode active material, a conductive material, a binding material, and a solvent, thus preparing a cathode active material composition, after which the cathode active material composition is directly applied on an aluminum current collector and then dried, or after which the cathode active material composition may be cast on an additional support, and a film separated from the support may be laminated on the aluminum current collector.

Examples of the cathode active material may include, but are not limited to, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0=x=0.5, 0=y=0.5), $LiFeO_2$, $LiFePO_4$, $V_2O_5$, TiS, MoS, etc., and any material may be used so long as it is useful as a cathode active material in the art.

Furthermore, the cathode active material, the conductive material, the binding material, and the solvent are mixed in amounts typically used in a lithium battery, and one or more selected from among the conductive material, the binding material, and the solvent may be omitted depending on the end uses and construction of the lithium battery.

In some cases, the cathode active material composition and the anode active material composition are further added with a plasticizer, so that pores are formed in the electrode plates.

Subsequently, a separator may be interposed between the cathode and the anode. As the separator, any material may be used so long as it is typically useful in a lithium battery. Preferably used is a separator which has low resistance to electrolyte ion transfer and has high electrolyte humidification. For example, the separator may be selected from among glass fibers, polyester, Teflon, polyethylene, polypropylene, polytetrafluoroethylene (PTFE) and combinations thereof, and may be provided in the form of nonwoven or woven fabric.

Also, the electrolyte may be in a solid, liquid, or gel phase. For example, the electrolyte may be an organic electrolyte, boron oxide, lithium oxynitride, etc., but is not limited thereto, and any electrolyte may be used so long as it is useful as an electrolyte in a liquid, solid or gel phase in the art. In the case where the electrolyte is in a solid phase, it may be formed on the anode using a process such as sputtering, vapor deposition, etc.

The electrolyte of the lithium battery may be an organic electrolyte. The organic electrolyte is prepared by dissolving a lithium salt in an organic solvent. Any organic solvent may be used so long as it is useful as an organic solvent in the art. Examples thereof include propylene carbonate, ethylene carbonate, fluoroethylene carbonate, diethyl carbonate, methyl- ethyl carbonate, methylpropyl carbonate, butylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylisopropyl carbonate, ethylpropyl carbonate, dipropyl carbonate, dibutyl carbonate, diethylene glycol, dimethylether, and mixtures thereof. Also, as the lithium salt which is dissolved in such an organic solvent, any lithium salt may be used so long as it is useful in the art. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, and mixtures thereof.

The lithium battery thus manufactured includes an anode, a cathode, and a separator. Specifically, the lithium battery is configured such that the cathode, the anode, and the separator are wound or folded and thus accommodated in a battery case. Subsequently, an organic electrolyte is injected into the battery case, and the battery case is sealed with a cap assembly, thus completing the lithium battery. The battery case may be provided in the form of a cylindrical shape, a polyhedral shape, a thin film shape, etc. The lithium battery according to the present invention may be a thin-film battery or a lithium ion battery.

Meanwhile, a lithium-ion polymer battery may be manufactured using the anode active material according to the present invention. In order to manufacture such a lithium-ion polymer battery, a separator is disposed between an anode using the anode active material according to the present invention and a cathode, thus forming a battery structure. Subsequently, the battery structure is stacked in a bi-cell configuration and then impregnated with an organic electrolyte, after which the resulting product is accommodated in a pouch and sealed, thus completing the lithium-ion polymer battery.

Alternatively, battery structures which are pre-formed to manufacture a lithium-ion polymer battery may be stacked, thus forming a battery pack, and the battery pack thus obtained may be employed in all devices requiring high capacity and high output.

In the nitrogen-doped porous carbon nanofibers containing the metal oxide and the manufacturing method thereof, the nitrogen-doped porous carbon nanofibers containing titanium oxide having ones of nanometers may be easily prepared, and the amount of nitrogen, the amount of metal oxide, the size and amount of pores, the diameter of carbon fibers, and the size of metal oxide may be appropriately controlled. As such, the metal oxide may be titanium oxide, which is the most effective in the present invention.

Also, the nitrogen-doped porous carbon nanofibers containing the metal oxide according to the present invention may exhibit improved capacity and cycle properties, and thus an anode and a lithium battery, using the same, may manifest superior electrical properties.

Also, the nitrogen-doped porous carbon nanofibers containing the metal oxide have a very high electron transfer rate, and may thus be applied to catalysts and electrode materials for solar cells, fuel cells, lithium air batteries, etc.

Below, preferred embodiments of the present invention are described in detail with reference to the appended drawings.

Example 1

Anode Active Material

A first solution obtained by adding 1.5 g of titanium butoxide (TBO) as a metal oxide precursor and 3 mL of acetic acid to 3 mL of ethanol and mixing them together for 30 min, a second solution obtained by dissolving 0.529 g of polyvinylpyrrolidone (PVP) in 7.4 mL of ethanol, and an ionic liquid solution containing 0.1 mL of ethylmethylimidazolium dicyanamide (EMIM DCA), were homogeneously mixed for 30 min, thus preparing an electrospinning solution (S10).

The electrospinning solution was placed in a syringe, and a voltage of 20 kV was applied while supplying the electrospinning solution into an electrospinning device at a flow rate of 0.5 mL/h using a syringe pump, so that the electrospinning solution was electrospun. As such, the distance from the tip of a nozzle to a collection unit was set to 20 cm, and nitrogen-doped porous carbon nanofibers were obtained using a drum type collection unit for uniform collection (S20).

The nitrogen-doped porous carbon nanofibers were oxidized at 280° C. for 5 hr in an air atmosphere so that the structure thereof was stabilized, and were then carbonized at 550° C. for 3 hr in an Ar atmosphere, thus preparing an anode active material comprising nitrogen-doped porous carbon nanofibers containing a metal oxide (S30).

Example 2

Anode Active Material

A first solution obtained by adding 1.5 g of TBO and 3 mL of acetic acid to 3 mL of ethanol and mixing them together for 30 min, a second solution obtained by dissolving 0.514 g of PVP in 7.2 mL of ethanol, and an ionic liquid solution containing 0.3 mL of EMIM DCA, were homogeneously mixed for 30 min, thus preparing an electrospinning solution.

The electrospinning solution was placed in a syringe, and a voltage of 20 kV was applied while supplying the electrospinning solution into an electrospinning device at a flow rate of 0.5 mL/h using a syringe pump, so that the electrospinning solution was electrospun. As such, the distance from the tip of a nozzle to a collection unit was set to 20 cm, and nitrogen-doped porous carbon nanofibers were obtained using a drum type collection unit for uniform collection.

The nitrogen-doped porous carbon nanofibers were oxidized at 280° C. for 5 hr in an air atmosphere so that the structure thereof was stabilized, and were then carbonized at 550° C. for 3 hr in an Ar atmosphere, thus preparing an anode active material comprising nitrogen-doped porous carbon nanofibers containing a metal oxide.

Example 3

Anode Active Material

A first solution obtained by adding 1.5 g of TBO and 3 mL of acetic acid to 3 mL of ethanol and mixing them together for 30 min, a second solution obtained by dissolving 0.5 g of PVP in 7 mL of ethanol, and an ionic liquid solution containing 0.5 mL of EMIM DCA, were homogeneously mixed for 30 min, thus preparing an electrospinning solution.

The electrospinning solution was placed in a syringe, and a voltage of 20 kV was applied while supplying the electrospinning solution into an electrospinning device at a flow rate of 0.5 mL/h using a syringe pump, so that the electrospinning solution was electrospun. As such, the distance from the tip of a nozzle to a collection unit was set to 20 cm, and nitrogen-doped porous carbon nanofibers were obtained using a drum type collection unit for uniform collection.

The nitrogen-doped porous carbon nanofibers were oxidized at 280° C. for 5 hr in an air atmosphere so that the structure thereof was stabilized, and were then carbonized at 550° C. for 3 hr in an Ar atmosphere, thus preparing an anode active material comprising nitrogen-doped porous carbon nanofibers containing a metal oxide.

Example 4

Anode and Lithium Battery (Coin Cell)

80 wt % of the anode active material of Example 1, 10 wt % of carbon powder (Super C65, Timcal), and 10 wt % of polyvinylidene fluoride (PVDF) were mixed using an agate mortar, thus preparing a slurry. The slurry was applied to a thickness of about 80 μm on a copper foil using a doctor blade, dried at room temperature for 2 hr, and then additionally dried at 120° C. for 2 hr in a vacuum, thus manufacturing an anode.

The anode thus manufactured and a cathode comprising lithium metal were prepared, a polypropylene separator (Celgard 2400) was used, and a solution of 1M $LiPF_6$ in EC (Ethylene Carbonate)+DEC (Diethylene Carbonate) (1:1 volume ratio) was used as an electrolyte, thus manufacturing a CR-2032 lithium battery (coin cell).

Example 5

Anode and Lithium Battery

An anode and a lithium battery (coin cell) were manufactured in the same manner as in Example 4, with the exception that the anode active material of Example 2 was used.

Example 6

Anode and Lithium Battery

An anode and a lithium battery (coin cell) were manufactured in the same manner as in Example 4, with the exception that the anode active material of Example 3 was used.

Comparative Example 1

A first solution obtained by adding 1.5 g of TBO and 3 mL of acetic acid to 3 mL of ethanol and mixing them together for 30 min, and a second solution obtained by dissolving 0.536 g of PVP in 7 mL of ethanol were homogeneously mixed for 30 min, thus preparing an electrospinning solution.

The electrospinning solution was placed in a syringe, and a voltage of 20 kV was applied while supplying the electrospinning solution into an electrospinning device at a flow rate of 0.5 mL/h using a syringe pump, so that the electrospinning solution was electrospun. As such, the distance from the tip of a nozzle to a collection unit was set to 20 cm, and nitrogen-doped porous carbon nanofibers were obtained using a drum type collection unit for uniform collection.

The nitrogen-doped porous carbon nanofibers were oxidized at 280° C. for 5 hr in an air atmosphere so that the structure thereof was stabilized, and were then carbonized at 550° C. for 3 hr in an Ar atmosphere, thus preparing an anode active material comprising nitrogen-doped porous carbon nanofibers containing a metal oxide.

Comparative Example 2

An anode and a lithium battery (coin cell) were manufactured in the same manner as in Example 4, with the exception that the anode active material of Comparative Example 1 was used.

The preferred embodiments of the present invention are summarized in Table 1 below.

TABLE 1

|  | Materials | Ionic liquid | PVP/Ethanol |
|---|---|---|---|
| Ex. 1 | Anode active material | $TiO_2$ + PVP + Ionic liquid | 0.1 mL | 0.529 g/7.4 mL |
| Ex. 2 | Anode active material | $TiO_2$ + PVP + Ionic liquid | 0.3 mL | 0.514 g/7.2 mL |
| Ex. 3 | Anode active material | $TiO_2$ + PVP + Ionic liquid | 0.5 mL | 0.5 g/7 mL |
| Ex. 4 | Anode and lithium battery | Anode formed using anode active material of Ex. 1, and lithium battery including the anode | | |
| Ex. 5 | Anode and lithium battery | Anode formed using anode active material of Ex. 2, and lithium battery including the anode | | |
| Ex. 6 | Anode and lithium battery | Anode formed using anode active material of Ex. 3, and lithium battery including the anode | | |
| Comp. Ex. 1 | Anode active material | $TiO_2$ + PVP | — | 0.536 g/7.5 mL |
| Comp. Ex. 2 | Anode and lithium battery | Anode formed using anode active material of Comp. Ex. 1, and lithium battery including the anode | | |

Figure 4A:
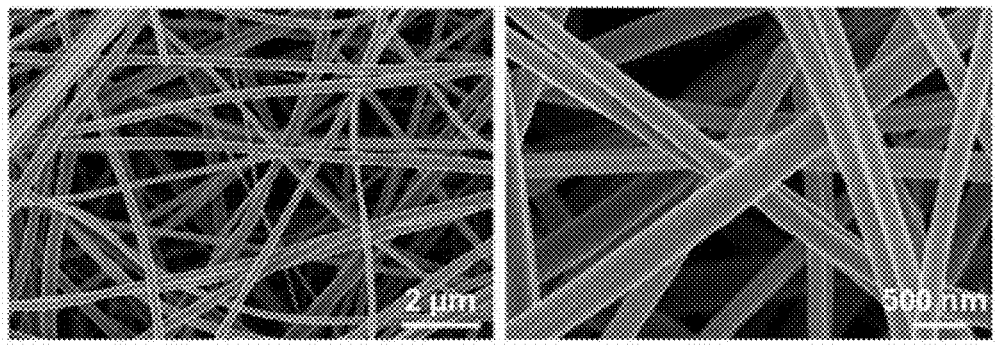
FIGS. 4A to 4C are scanning electron microscope (SEM) images illustrating the anode active materials manufactured in the examples.
Figure 4B:
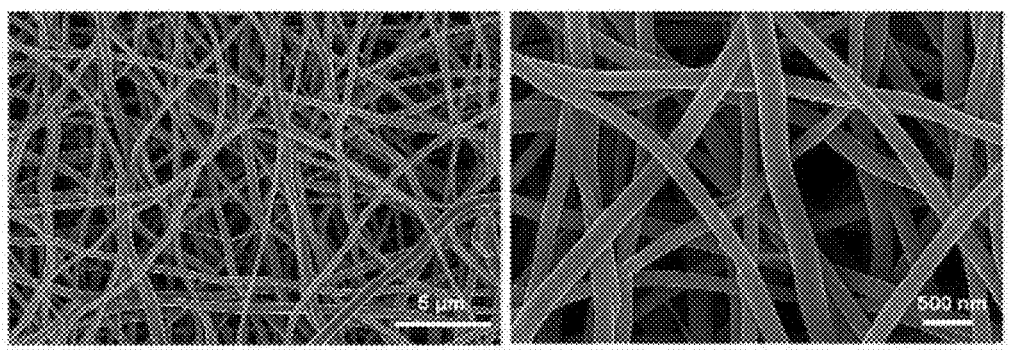
Figure 4C:
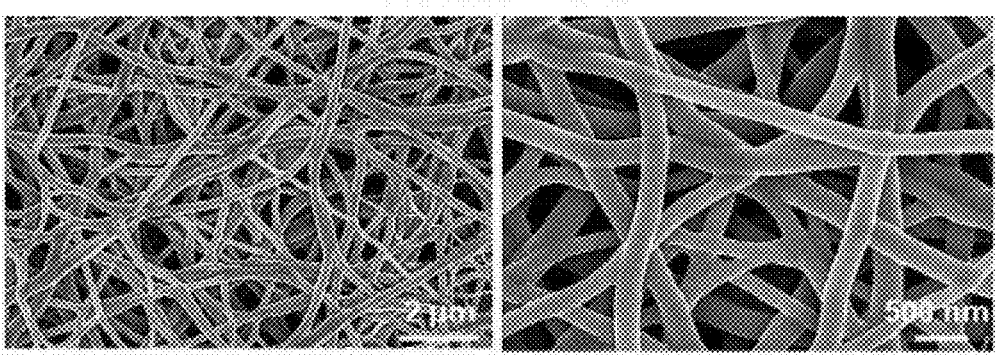
Figure 4D:
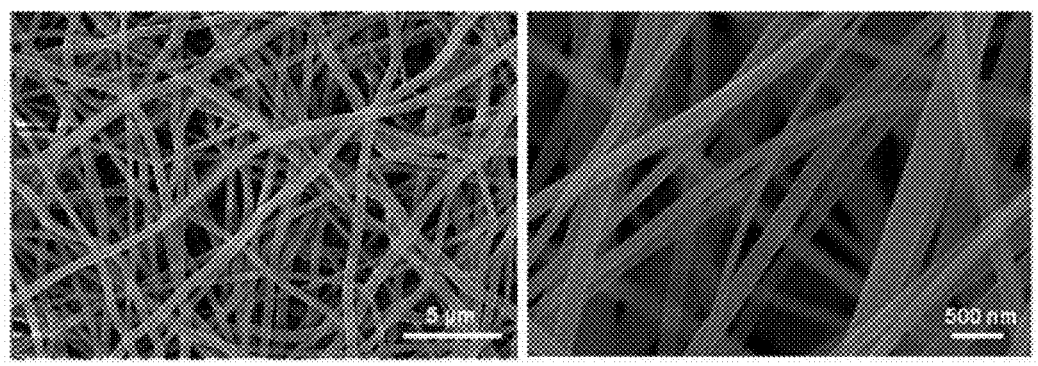
FIG. 4D is of SEM images illustrating the anode active material manufactured in Comparative Example 1.

FIGS. 4A to 4C are SEM images illustrating the anode active materials of Examples 1 to 3, respectively, and FIG. 4D is of SEM images illustrating the anode active material of Comparative Example 1. As illustrated in FIGS. 4A to 4D, the porous carbon nanofibers (FIGS. 4A to 4C) with the ionic liquid and the carbon nanofibers (FIG. 4D) without the ionic liquid had a fiber diameter of 200~300 μm and were provided in the form of a one-dimensional fibrous phase. Thereby, it can be confirmed that the ionic liquid has no influence on the shape and the size (diameter) of the carbon nanofibers of the anode active material.

Figure 5A:
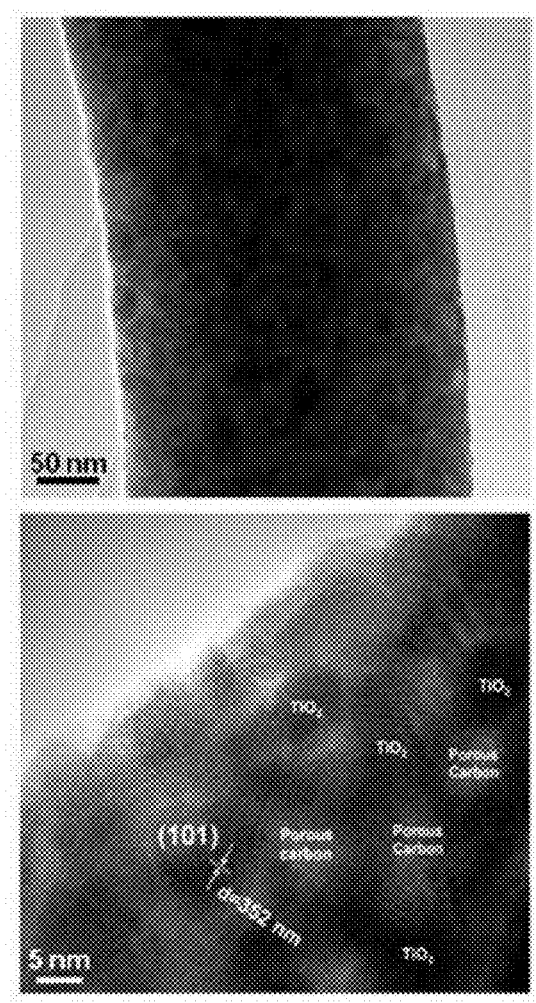
FIG. 5A is of transmission electron microscope (TEM) images illustrating the anode active material manufactured in Example 2.
Figure 5B:
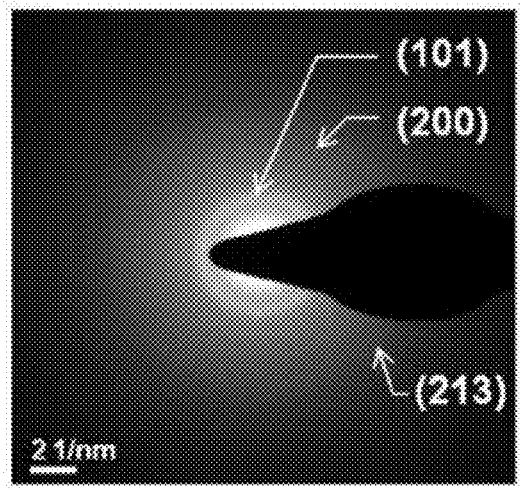
FIG. 5B illustrates a selected area diffraction pattern (SADP) of the TEM image of the anode active material of Example 2.

FIG. 5A is of TEM images illustrating the anode active material of Example 2. As seen in the high-magnification TEM image of the anode active material of Example 2, not only the metal oxide but also the pores are formed in the carbon nanofibers of the anode active material. As seen in FIG. 5B illustrating the SADP (Selected Area Diffraction Pattern) of the anode active material of Example 2, in the case of the anode active material of Example 2 using the ionic liquid, the (200) plane fringe of anatase titanium oxide in which the average size of the crystalline domain is 10 nm and the lattice distance is 0.189 nm is observed well. This is because the ionic liquid and the PVP used as the carbon fiber precursor have different carbonization temperatures, and thus pores are formed in the course of thermal treatment, so that the carbon nanofibers are maintained in a porous form.

When the carbon nanofibers are provided in a porous form in this way, lithium ions may be easily diffused in a direction perpendicular to the longitudinal axis direction of the carbon nanofibers, thus improving rate capability. Furthermore, carbon and titanium oxide are organically connected to each other so that good electrical connection between the grains is ensured, thereby decreasing resistance between the grain boundaries. Moreover, because the carbon fibers are in a porous form, the reaction area between titanium oxide and lithium ions may increase, ultimately raising actual efficiency.

Figure 5C:
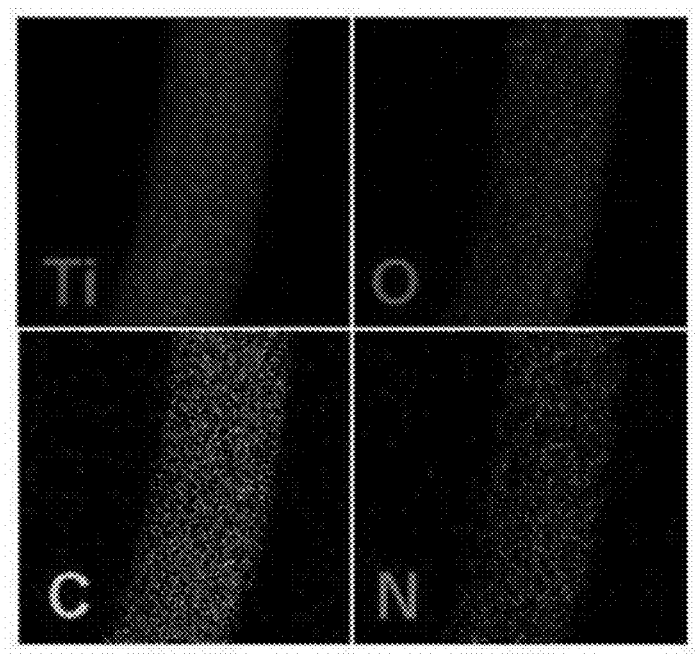
FIG. 5C illustrates the elemental analysis results of the anode active material of Example 2 using energy dispersive X-ray spectroscopy (EDS)

As seen in FIG. 5C illustrating the elemental analysis results of the anode active material of Example 2 using EDS (Energy Dispersive X-ray Spectroscopy), titanium (Ti), oxygen (O), carbon (C), and nitrogen (N) are uniformly distributed in the porous carbon nanofibers.

Figure 6:
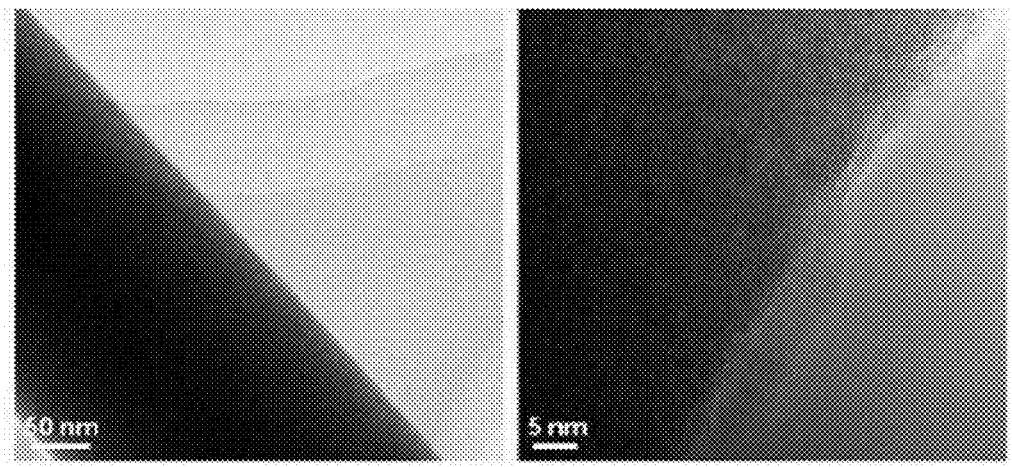
FIG. 6 is of TEM images illustrating the anode active material of Comparative Example 1.

However, in Comparative Example 1 without the use of the ionic liquid, as seen in the TEM images of FIG. 6, the carbon nanofibers are provided in compact form without pores therein.

That is, in the present invention, the nitrogen-doped porous carbon nanofibers containing the metal oxide are prepared by properly adding the ionic liquid, and are used as the anode material of a lithium secondary battery, thereby increasing actual efficiency and enabling fast charge-discharge.

Figure 7:
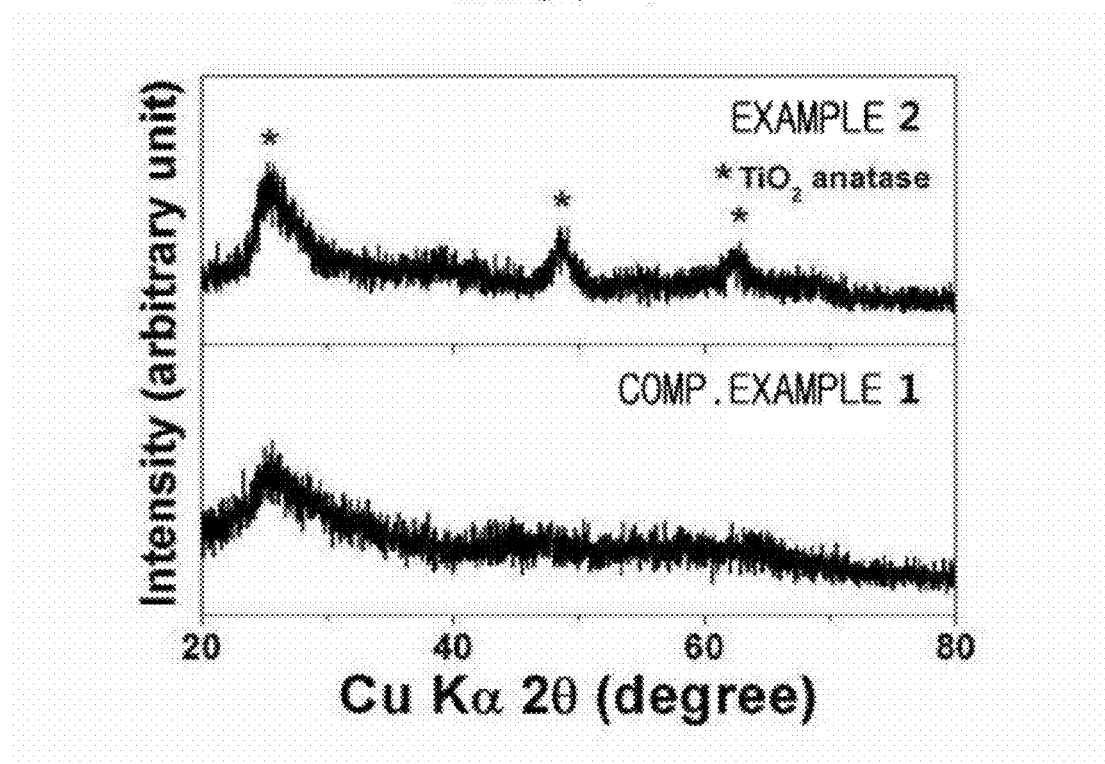
FIG. 7 is a graph illustrating the X-ray diffraction (XRD) of the anode active materials of Example 2 and Comparative Example 1.

FIG. 7 is a graph illustrating the XRD of Example 2 and Comparative Example 1. In the case of Example 2, crystalline anatase titanium oxide is formed in the nitrogen-doped amorphous carbon nanofibers, and carbon is present in amorphous form. However, in the case of Comparative Example 1, the nitrogen-doped amorphous carbon is formed but crystalline anatase titanium oxide is not formed. Thereby, in the case where the nitrogen-doped carbon nanofibers containing the metal oxide are prepared using the ionic liquid, the ionic liquid can be confirmed to play a role in increasing the crystallinity of titanium oxide.

Figure 8:
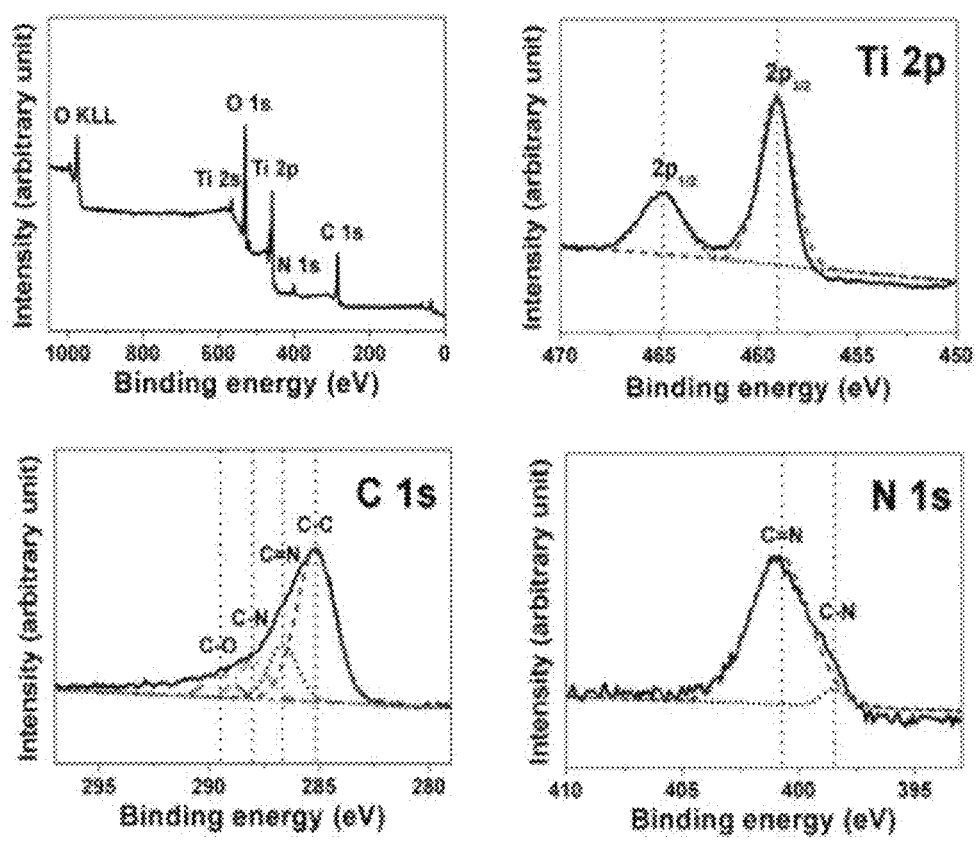
FIG. 8 is of graphs illustrating the X-ray photoelectron spectroscopy (XPS) of the anode active material of Example 2.

FIG. 8 is of graphs illustrating the XPS of Example 2. Titanium (Ti) 2p, oxygen (O) 1s, carbon (C) 1s, and nitrogen (N) 1s peaks are obviously shown in the nitrogen-doped porous carbon fibers containing the metal oxide. In the case of Ti 2p, two main peaks related to Ti $2p_{3/2}$ and Ti $2p_{1/2}$ are shown at 459.1 eV and 464.8 eV. This is associated with $Ti^{4+}$ in an octahedral structure, and Ti 2p peaks show typical binding energy forms of titanium oxide. The C 1s peak shows a carbon-carbon bond (C—C 285.1 eV), a carbon-nitrogen bond (C=N 286.7 eV, C—N 288 eV), and a carbon-oxygen bond (C—O 289.5 eV). The N 1s peak may show a mixed bond form due to a variety of oxidation states of nitrogen as seen in the C 1s peak. Among the C—N bonds, a C—N single bond appears at 398.5 eV, and a C=N double bond appears at 400.8 eV. This is an effect caused when carbon is doped with nitrogen, and in the case where carbon contains nitrogen, higher electrical conductivity may be exhibited compared to when carbon does not contain nitrogen, thereby enabling fast charge-discharge.

Figure 9A:
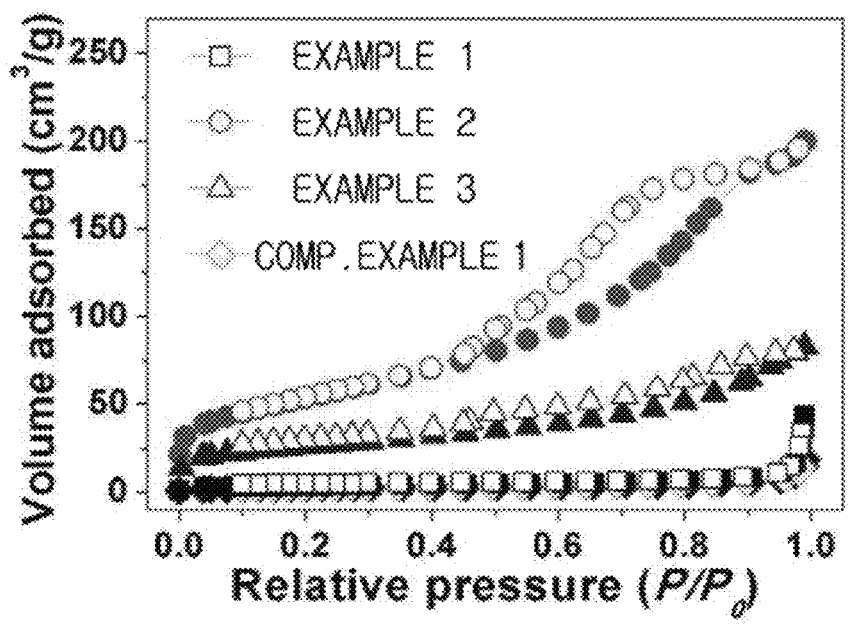
FIG. 9A is a graph illustrating the BET surface area of the anode active materials of Examples 1 to 3 and Comparative Example 1.
Figure 9B:
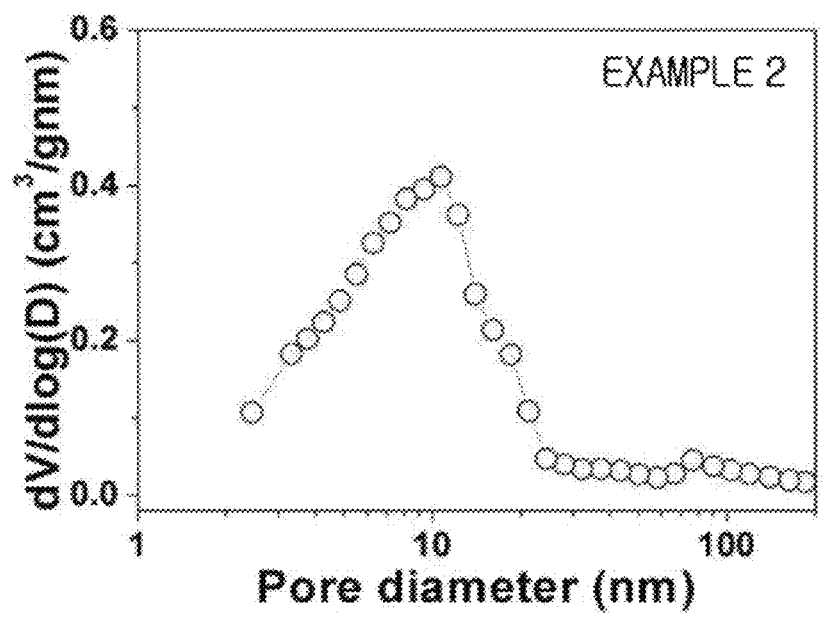
FIG. 9B is a graph illustrating the BJH pore size of the anode active material of Example 2.

FIG. 9A is a graph illustrating the BET surface area of Examples 1 to 3 and Comparative Example 1. As seen in this graph, the nitrogen-doped carbon nanofibers containing the metal oxide can be observed to have mesopores, the surface areas of Examples 1, 2 and 3 are 11 $m^2/g$, 191 $m^2/g$ and 90 $m^2/g$, respectively, and the surface area of Comparative Example 1 is 8 $m^2/g$. Among these, the surface area of Example 2 is maximal. The form of nanofibers having a large BET surface area results in rapid diffusion of lithium during charge-discharge, thereby manifesting improved rate capability. Also, FIG. 9B is a graph illustrating the BJH pore size of Example 2, and the analyzed pore size is 10 nm on average.

Figure 10:
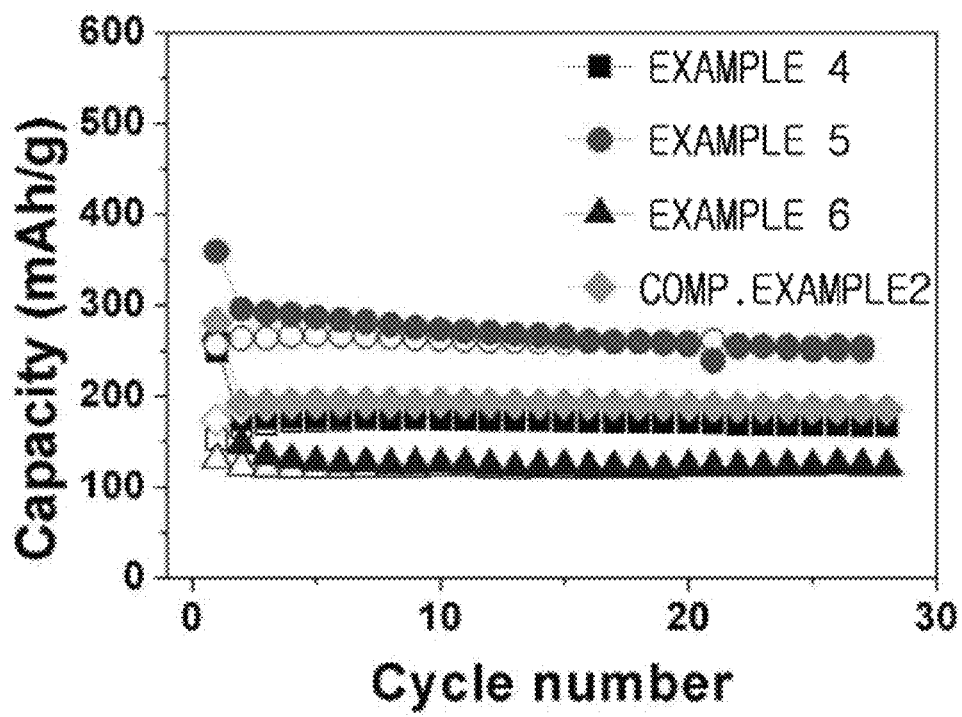
FIG. 10 is a graph illustrating the charge-discharge test results of the lithium batteries of Examples 4 to 6 and Comparative Example 2.

FIG. 10 illustrates the charge-discharge test results of Examples 4 to 6 and Comparative Example 2.

Specifically, discharge was performed at a current of 30 mA until a voltage reached 1.0 V (vs. Li) and charge was performed at the same current until the voltage reached 3.0 V (vs. Li), based on 1 g of each of the anode active materials of Examples 1 to 3 and Comparative Example 1 respectively contained in the lithium batteries of Examples 4 to 6 and Comparative Example 2. Subsequently, charge and discharge were repeated a total of 30 times in the same voltage range with the same current. The charge-discharge test results at room temperature of FIG. 10 are shown in Table 2 below.

TABLE 2

| | Initial Capacity (mAh/g) | Capacity retention after 28 charge-discharge cycles (%) |
|---|---|---|
| Ex. 4 (Lithium battery using Ex. 1) | 250 | 67 |
| Ex. 5 (Lithium battery using Ex. 2) | 352 | 73 |
| Ex. 6 (Lithium battery using Ex. 3) | 270 | 46 |
| Comp. Ex. 2 (Lithium battery using Comp. Ex. 1) | 282 | 65 |

As is apparent from Table 2, in the lithium battery of Example 5, a decrement in the capacity of the lithium battery after the charge-discharge test at room temperature is lower than that of the lithium battery of Comparative Example 2. That is, the lithium battery of Example 5 may exhibit higher initial capacity and much higher capacity retention, compared to the lithium battery of Comparative Example 2.

Figure 11:
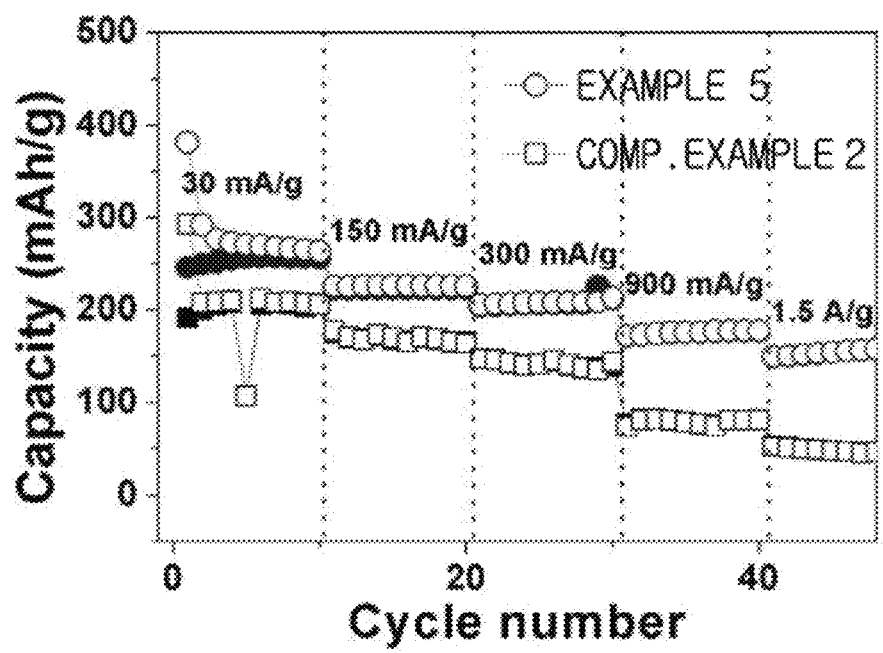
FIG. 11 is a graph illustrating the rate capability results of the lithium batteries of Example 5 and Comparative Example 2.

FIG. 11 illustrates the rate capability test results at room temperature in the lithium batteries of Example 5 and Comparative Example 2. Specifically, multi-rate capability experiments were sequentially repeated ten times under conditions of the current upon charge being set to be the same and the current upon discharge being set to be different while the voltage range of Example 5 and Comparative Example 2 was maintained the same. Then, discharge was performed galvanostatically at a current of each of 30 mA, 150 mA, 300 mA, 900 mA, and 1500 mA until a voltage reached 1.0 V (vs. Li) and charge was performed at a constant current of 30 mA until the voltage reached 3.0 V (vs. Li), based on 1 g of each of the anode active materials respectively contained in the lithium batteries. As seen in this graph, the rate capability of the lithium battery of Example 5 is superior to that of the lithium battery of Comparative Example 2.

Figure 12:
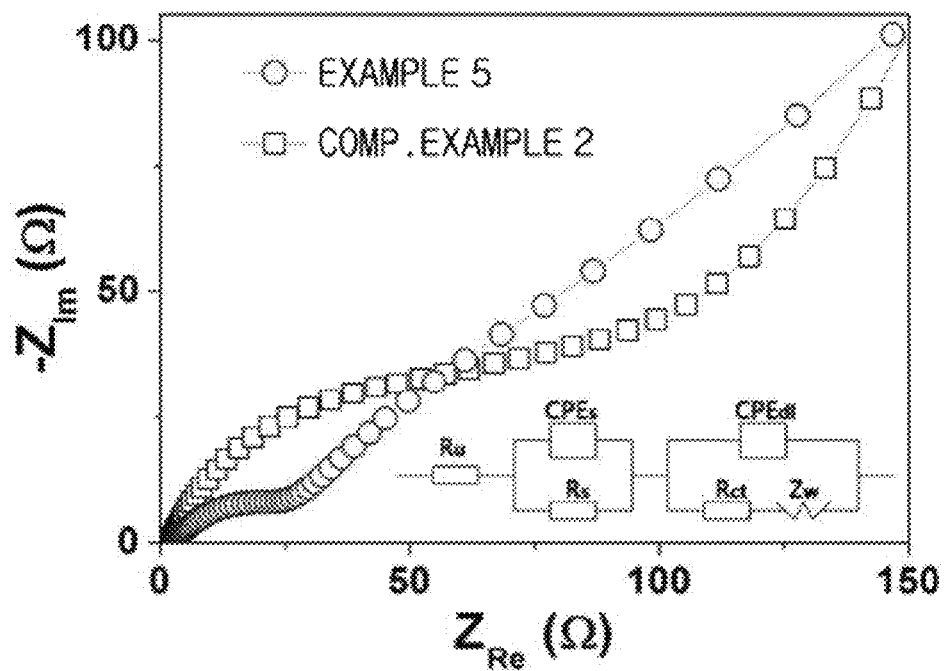
FIG. 12 is a graph illustrating the impedance results of the lithium batteries of Example 5 and Comparative Example 2.

FIG. 12 illustrates the impedance test results of the lithium batteries of Example 5 and Comparative Example 2. Specifically, discharge was performed at a current of 30 mA until a voltage reached 1.0 V (vs. Li) and charge was performed at the same current until the voltage reached 3.0 V (vs. Li), based on 1 g of each of the anode active materials respectively contained in the lithium batteries of Example 5 and Comparative Example 2. Subsequently, charge and discharge were repeated 20 times in the same voltage range with the same current, after which impedance analysis was conducted at a voltage of 3.0 V (vs. Li). As seen in this graph, the lithium battery of Example 2 is more stable than the lithium battery of Comparative Example 2.

According to the method of manufacturing the anode active material as above, the nitrogen-doped porous carbon nanofibers containing a nano-sized metal oxide dispersed therein may be easily prepared, and the amount of nitrogen, the amount of titanium oxide, the diameter of carbon fibers, and the size of titanium oxide may be appropriately controlled.

Also, the nitrogen-doped porous carbon nanofibers containing a metal oxide according to the present invention are used as the anode active material, so that rate capability, stability, and lifetime properties may be improved, thereby enabling the formation of an anode and a lithium battery having superior electrical properties.

Also, the anode active material according to the present invention may be applied to catalysts and electrode materials for solar cells, fuel cells, lithium air batteries, etc., because of the very high electron transfer rate thereof.

The method of manufacturing the anode active material, and the anode and the lithium battery using the anode active material, are not limited to the constructions and operation modes of the embodiments mentioned as above. Part or all of the above embodiments may be selectively combined so that a variety of modifications may be formed.

As described hereinbefore, the present invention provides a method of manufacturing an anode active material, and an anode and a lithium battery using the anode active material. According to the present invention, the method of manufacturing the anode active material enables titanium oxide having a size of ones of nanometers to be easily distributed in nitrogen-doped porous carbon nanofibers, and the amount of nitrogen, the amount of titanium oxide, the size of pores, the diameter of carbon fibers, and the size of titanium oxide can be appropriately controlled.

Also, the anode active material according to the present invention can exhibit improved capacity and cycle properties, and thus an anode and a lithium battery using the anode active material can manifest superior electrical properties.

Further, the anode active material according to the present invention can be applied to catalysts and electrode materials for solar cells, fuel cells, lithium air batteries, etc., by virtue of a very high electron transfer rate thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an anode active material, comprising:
   mixing a first solution having a metal oxide precursor dissolved therein, a second solution having a polymer as a carbon fiber precursor dissolved therein, and an ionic liquid solution for nitrogen doping and formation of a porous structure, thus preparing an electrospinning solution;
   electrospinning the electrospinning solution to convert the carbon fiber precursor into nitrogen-doped porous carbon nanofibers to form a composite including the nitrogen-doped porous carbon nanofibers;
   primarily heating the composite to 280° C. and thermally treating the primarily heated composite in an air atmosphere to stably maintain a shape of the nitrogen-doped porous carbon nanofibers in the composite; and
   secondarily heating the thermally treated composite to 500° C. and thermally treating the secondarily heated composite in an argon (Ar) atmosphere to convert the metal oxide precursor into a metal oxide and thus form a metal oxide-nitrogen-porous carbon nanofiber composite.

2. The method of claim 1, wherein a solvent used in the first solution and the second solution is any one selected from the group consisting of distilled water, dimethylformamide, phenol, toluene, ethanol, methanol, and propanol.

3. The method of claim 1, wherein the metal oxide precursor is titanium butoxide (TBO) or a metal chloride.

4. The method of claim 3, wherein the metal chloride is any one selected from the group consisting of titanium isopropoxide ($Ti(OCH(CH_3)_2)_4$), titanium chloride ($TiCl_4$ or $TiCl_3$), tin hydrate ($SnCl_2 \cdot H_2O$), iron chloride ($FeCl_3$), nickel chloride ($NiCl_2$), copper chloride ($CuCl_2$), magnesium chloride ($MgCl_2$), palladium chloride ($PdCl_2$), cobalt chloride ($CoCl_2$), tantalum chloride ($TaCl_2$), manganese chloride ($MnCl_2$), iron nitrate ($Fe(NO_3)_2$, $Fe(NO_3)_3$), nickel nitrate (Ni(NO$_3$)$_2$), copper nitrate (Cu(NO$_3$)$_2$), magnesium nitrate (Mg(NO$_3$)$_2$), cobalt nitrate (Co(NO$_3$)$_2$), manganese nitrate (Mn(NO$_3$)$_2$), manganese acetate (Mn(CO$_2$CH$_3$)$_2$), iron acetate (Fe(CO$_2$CH$_3$)$_2$), nickel acetate (Ni(CO$_2$CH$_3$)$_2$), cobalt acetate (Co(CO$_2$CH$_3$)$_2$), zinc acetate (Zn(CO$_2$CH$_3$)$_2$), and copper acetate (Cu(CO$_2$CH$_3$)$_2$).

5. The method of claim 1, wherein the polymer is any one selected from the group consisting of polyvinylpyrrolidone (PVP), polymethylmethacrylate (PMMA), polyvinyl alcohol (PVA), polyvinylacetate (PVAC), polyacrylonitrile (PAN), polyfurfuryl alcohol, cellulose, glucose, polyvinyl chloride (PVC), polyacrylic acid, polylactic acid, polyethylene oxide (PEO), polypyrrole, polyimide, polyamideimide, polyaramid, polyaniline (PANI), phenol resin, and pitch.

6. The method of claim 1, wherein the ionic liquid solution is any one selected from the group consisting of ethylmethylimidazolium chloride (EMIM Cl), ethylmethylimidazolium dicyanamide (EMIM DCA), ethylmethylimidazolium trifluoromethanesulfonate (EMIM Otf), ethylmethylimidazolium trifluoromethylsulfonylimide (EMIM TFSI), ethylmethylimidazolium acetate (EMIM Ac), ethylmethylimidazolium hydroxide (EMIM OH), ethylmethylimidazolium diethylphosphate (EMIM DEP), ethylmethylimidazolium methyl carbonate (EMIM MeOCO$_2$), ethylmethylimidazolium lactate (EMIM lactate), butylmethylimidazolium chloride (BMIM Cl), butylmethylimidazolium methylcarbonate solution (BMIM MeOCO$_2$), butylmethylimidazolium trifluoromethanesulfonate (BMIM Otf), butylmethylimidazolium trifluoromethylsulfonylimide (BMIM TFSI), butylmethylimidazolium trifluoroacetate (BMIM CF$_3$CO$_2$), and dimethylimidazolium methanesulfonate (MMIM CH$_3$SO$_3$).

7. The method of claim 1, wherein the electrospinning is performed by maintaining the electrospinning solution at 70° C. or less, and applying a voltage of 10~25 kV while supplying the electrospinning solution at a flow rate of 0.1~1 mL/h.

* * * * *